(12) United States Patent
Clark et al.

(10) Patent No.: US 7,080,674 B2
(45) Date of Patent: Jul. 25, 2006

(54) LOW INTERFERENCE TRACTION DEVICE FOR TIRES

(75) Inventors: Larry Clark, Amity, OR (US); Robert Anderson, Portland, OR (US); Roland Boehrer, Wilsonville, OR (US); Gary Scott, Milwaukie, OR (US)

(73) Assignee: Burns Bros., Inc., Lake Oswego, OR (US)

( * ) Notice: Subject to any disclaimer, the term of this patent is extended or adjusted under 35 U.S.C. 154(b) by 0 days.

(21) Appl. No.: 10/637,797

(22) Filed: Aug. 8, 2003

(65) Prior Publication Data

US 2005/0028913 A1    Feb. 10, 2005

(51) Int. Cl.
*B60C 11/00* (2006.01)
*B60C 27/00* (2006.01)

(52) U.S. Cl. .................................. 152/241; 152/219
(58) Field of Classification Search ............ 152/213 R, 152/213 A, 216–219, 221–222, 231, 239, 152/240–242
See application file for complete search history.

(56) References Cited

U.S. PATENT DOCUMENTS

| 4,366,849 A * | 1/1983 | Martinelli .................... 152/221 |
| 4,416,318 A | 11/1983 | Rieger et al. |
| 4,850,410 A | 7/1989 | Lew |
| 5,103,885 A * | 4/1992 | Chang ......................... 152/222 |
| 5,236,025 A | 8/1993 | Maresh |
| 5,299,613 A * | 4/1994 | Maresh ........................ 152/221 |
| 5,318,087 A * | 6/1994 | Chang Gun ................. 152/241 |
| 6,009,922 A | 1/2000 | Gogan |
| 6,026,876 A | 2/2000 | Snyder |
| 6,035,912 A * | 3/2000 | Clark .......................... 152/222 |
| 6,591,882 B1 * | 7/2003 | Clark et al. ............. 152/213 R |

OTHER PUBLICATIONS http://www.tirechain.com/sea.htm, Oct. 27, 2004 (see wayback machine sheet), entire document.*

* cited by examiner

*Primary Examiner*—Jason R. Bellinger
(74) *Attorney, Agent, or Firm*—Schwabe, Williamson & Wyatt, P.C.

(57) ABSTRACT

This invention relates to a tire chain designed to retain the strength characteristics of a prior tire chain but reducing the dimension of the tire chain components to be located at the inner wall of the tire so as to reduce the likelihood of interfering engagement with components that are closely positioned relative to the tire.

15 Claims, 18 Drawing Sheets

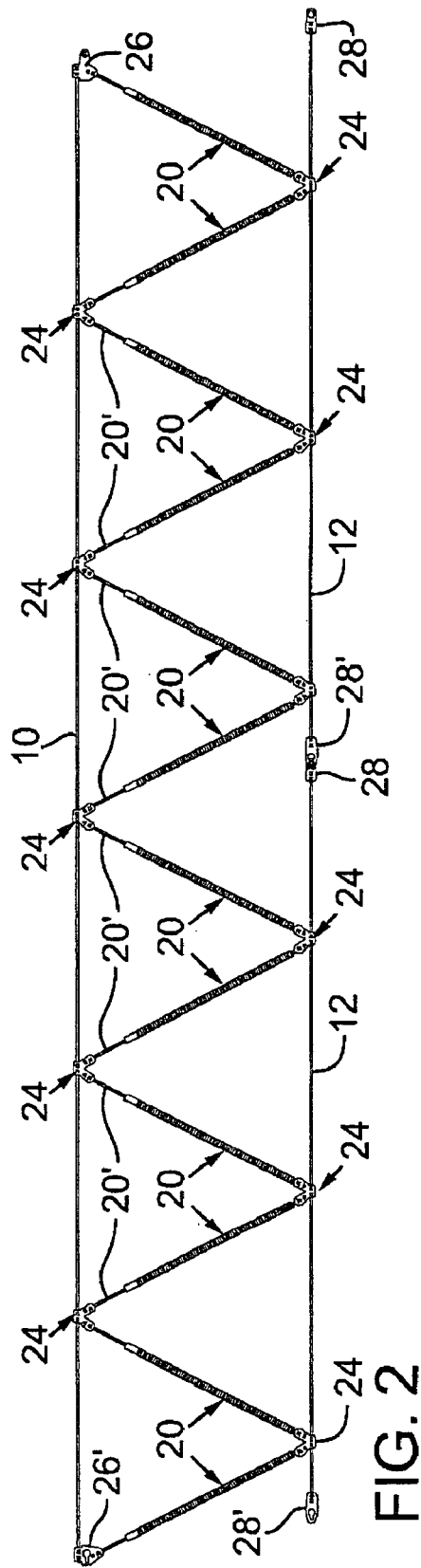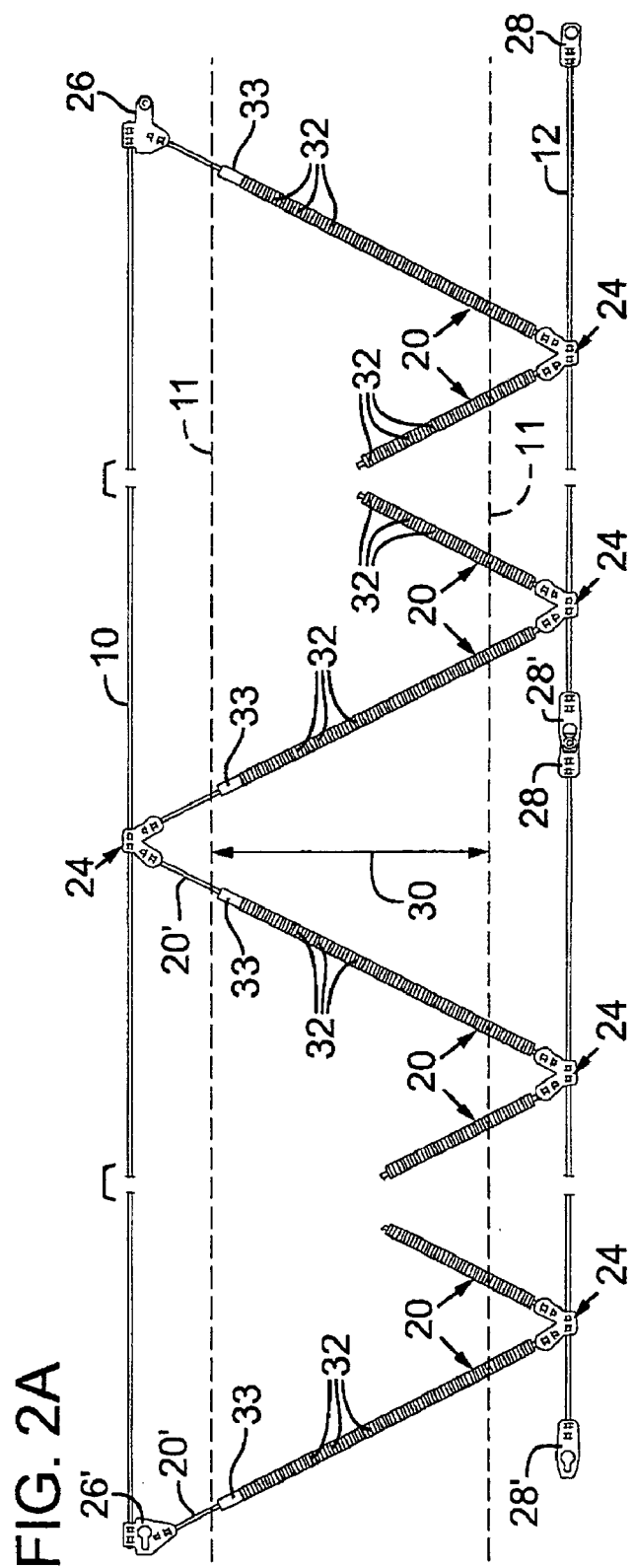
FIG. 2
FIG. 2A

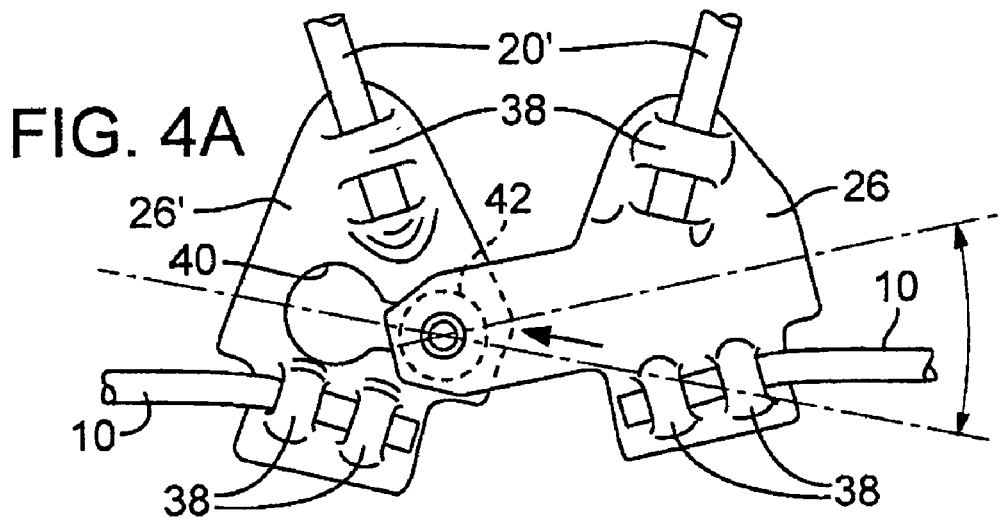
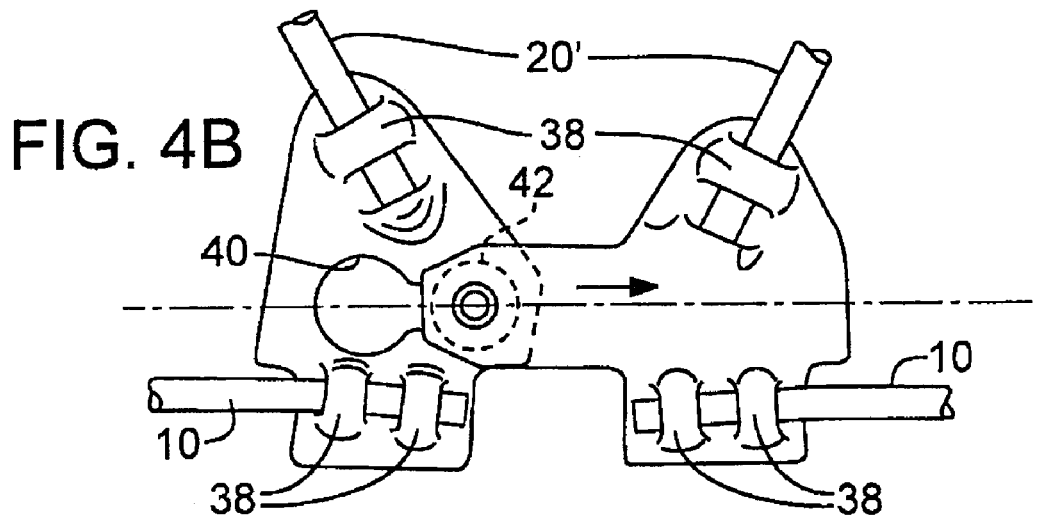
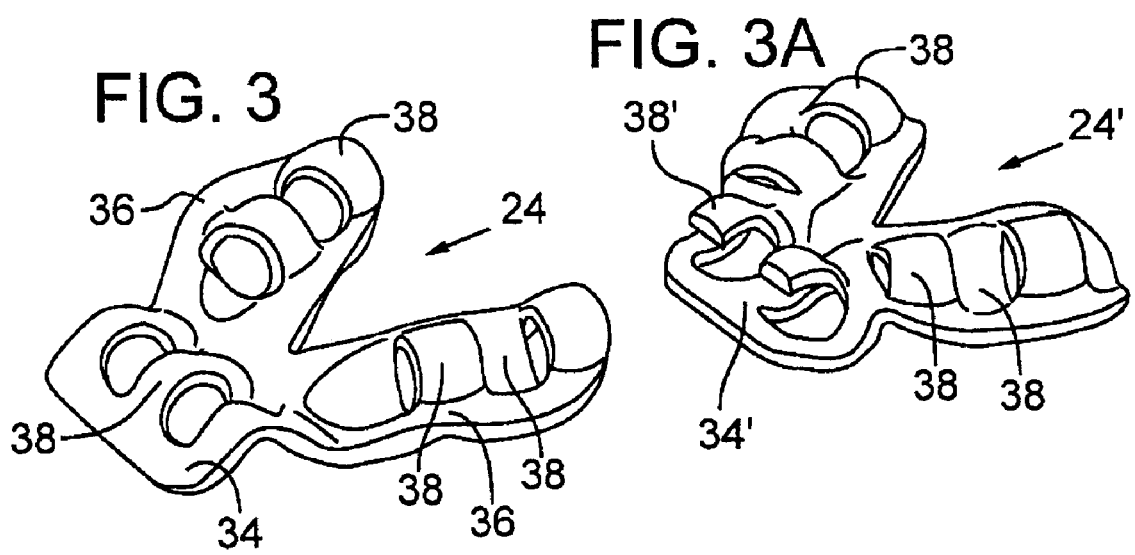

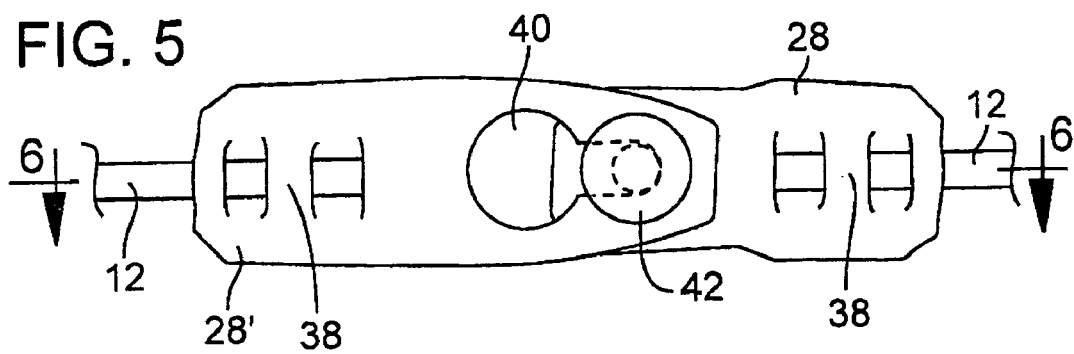
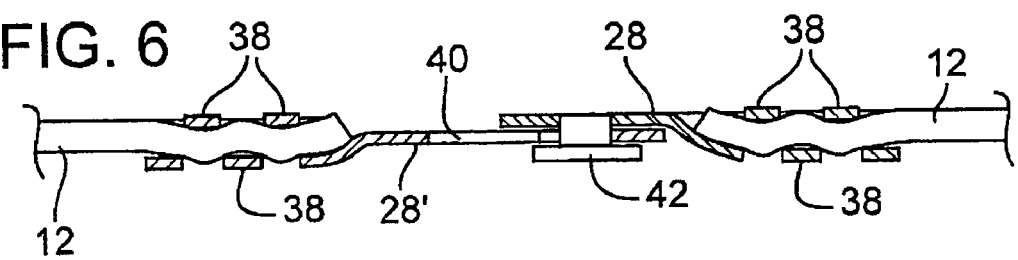
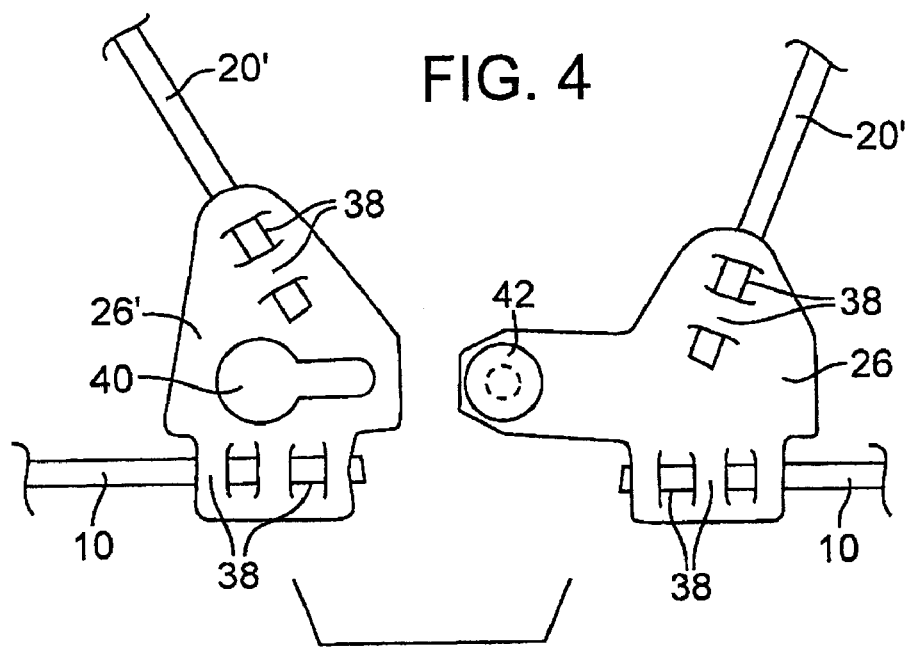

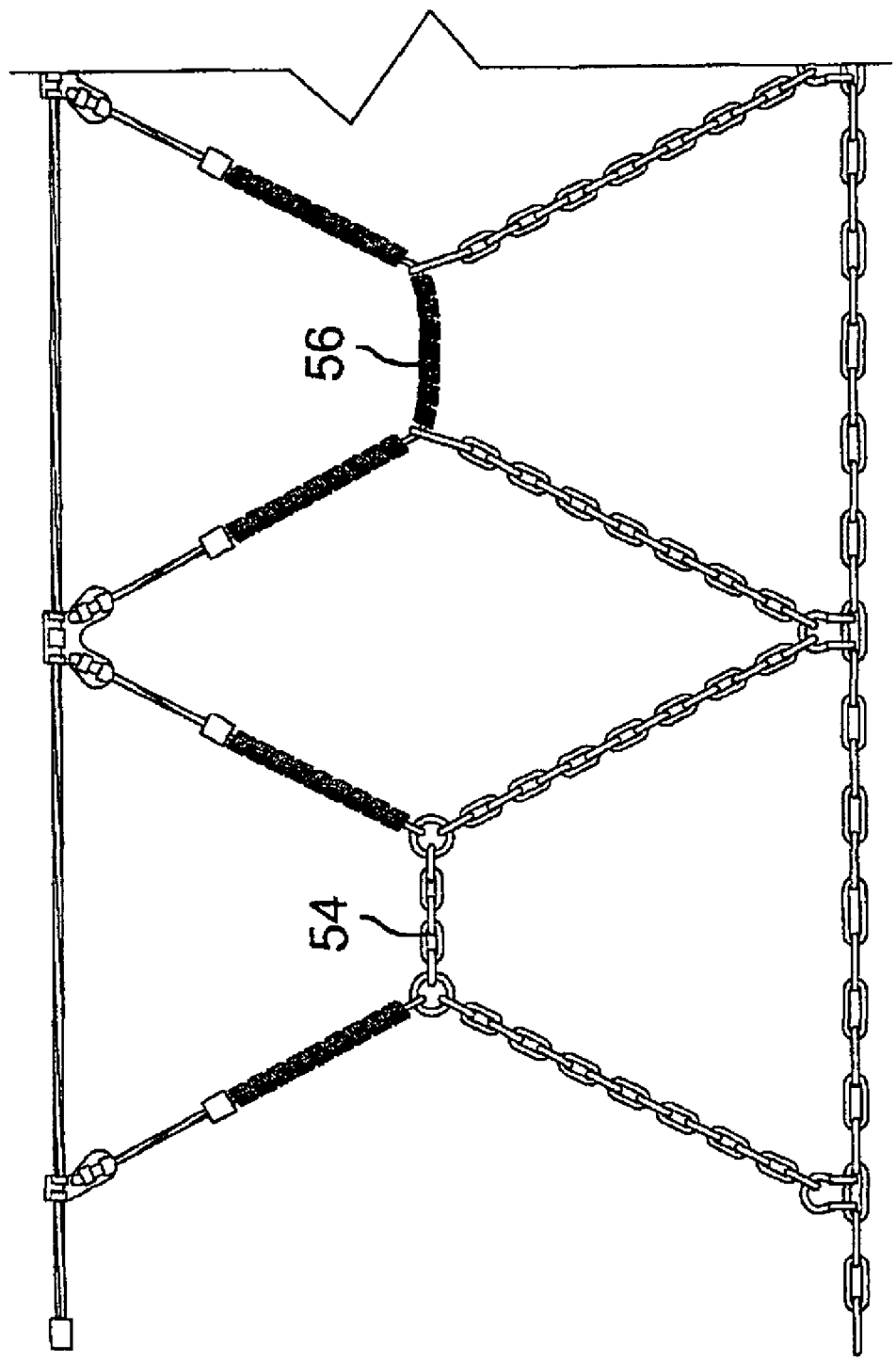

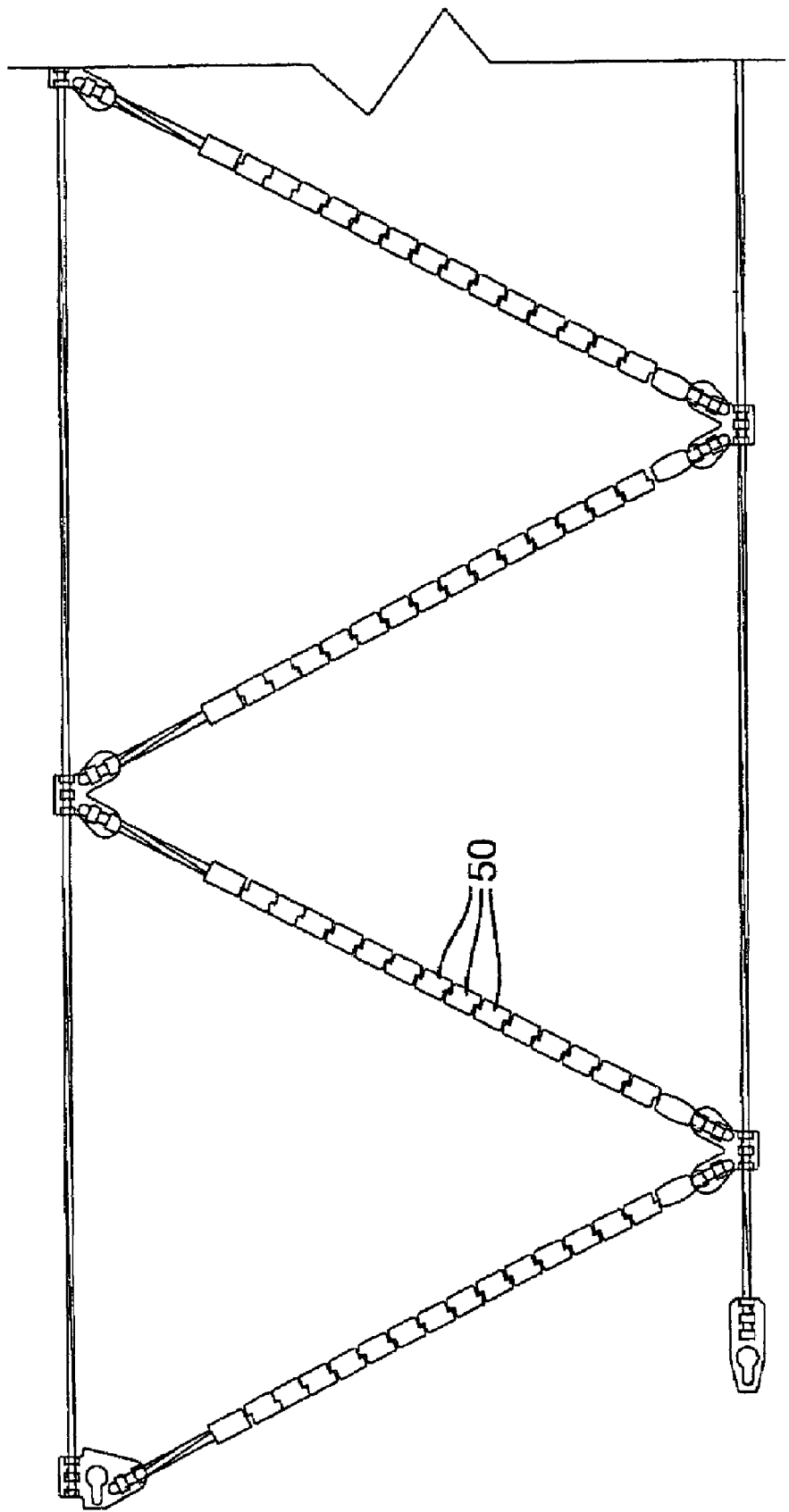

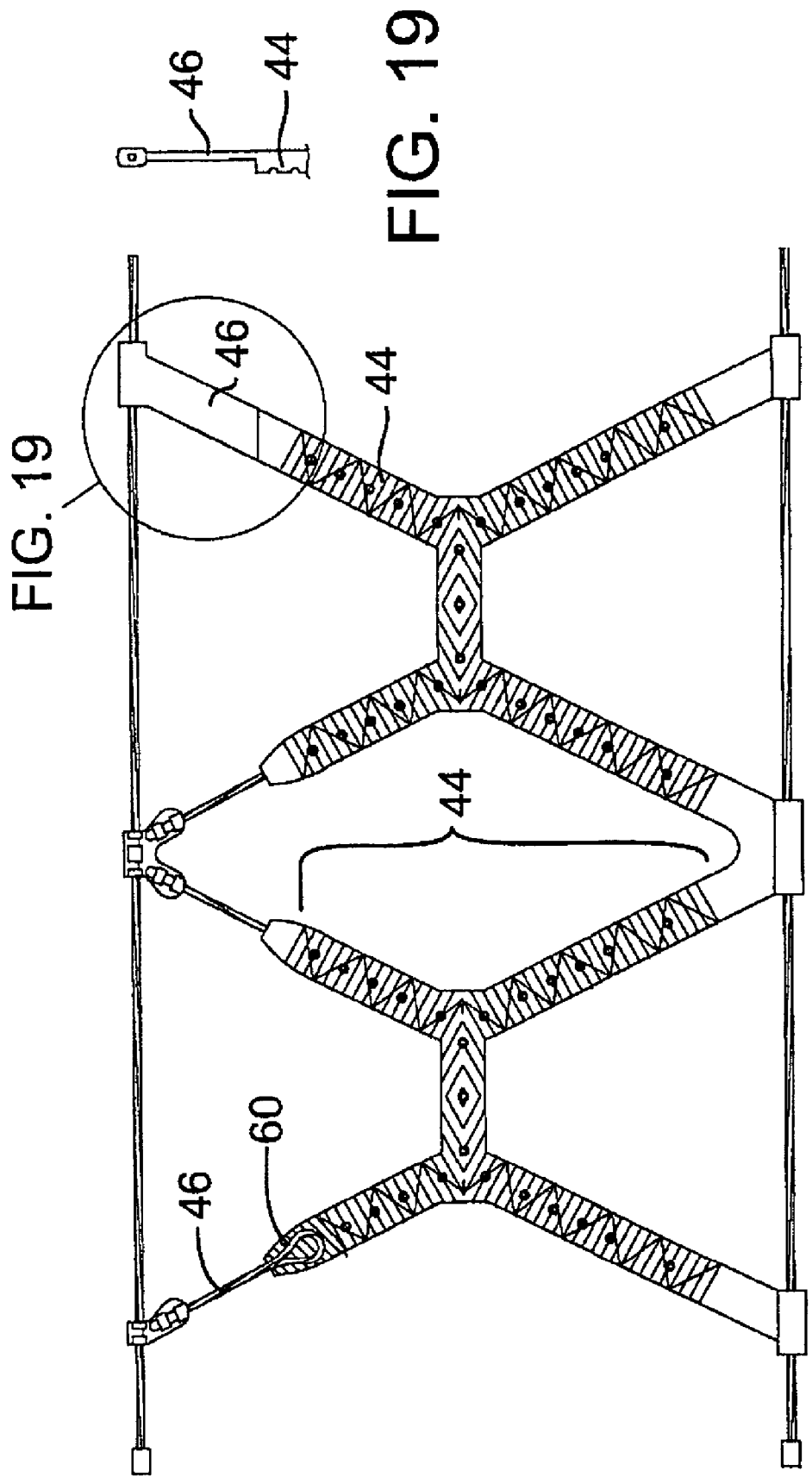

LOW INTERFERENCE TRACTION DEVICE FOR TIRES

FIELD OF THE INVENTION

This invention relates to traction devices applied to vehicle tires for added gripping, e.g. on roads covered with ice or snow, and more particularly to a traction device structure that can be applied and used on vehicles wherein minimal clearance is provided at the sides of the tires whereat the devices (tire chains) are secured to the tire.

BACKGROUND OF THE INVENTION

The use of tire chains on the drive wheels of vehicles is desirable for drivers who need to drive on snow or ice laden roadways. (Here the term "tire chains" has reference to all types of add-on traction devices, e.g. cable type as well as link type tire chains.) Such tire chains traditionally have been designed to withstand severe abuse and as so designed has been available and in use for decades. More recently, however, certain types of vehicles have been designed with less clearance at the inner side walls of the tires (as mounted on the vehicle) and the somewhat hefty design of the traditional tire chain does not have sufficient clearance to allow mounting of those chains onto the vehicle tires.

This predicament has resulted in new tire chain designs to enable such vehicles to be equipped with the desired supplemental traction. One new chain design simply reduces the components of the device in size. This results in a weaker chain that is more likely to fail and, upon failure, can cause undesirable damage and potential injury. Another type is a claw type that provides resilient gripping fingers that fit over the tread but no other securement is provided at the inside of the tire. Such devices are expensive and prone to being dislodged from the tire, again with unsatisfactory consequences.

It is accordingly an object of the present invention to provide a tire chain design that is of the more conventional type, i.e. secured at both the inside and outside of the tire, accommodates the lesser clearance but without sacrificing strength and integrity of the chain.

BRIEF DESCRIPTION OF THE INVENTION

The resolution of this problem is believed to be the separate consideration of the hereafter defined two major compositions of the tire chain. Those major compositions are first, that portion of the chain that spans the bottom surface of the tire tread to produce enhanced gripping of the tire to the road surface, e.g. when the road surface is covered with ice or snow; and second, that portion of the tire chain that produces securement of the chain to the tire.

Tire chains for which the present invention is primarily intended includes side members, cross members and connectors. The first major composition of these chains, as per the above definition, is the center portions only of the cross members. That is, the cross members extend from a position at one side wall of a tire radiating outwardly to the tread and across the lateral surface of a tread and then radially inwardly to the opposing side member. That portion of the cross member that extends across the lateral surface of the tread (and which becomes interposed between the tread and a road surface during operation) is considered to be the first major composition of the tire chain.

The criteria for this first major composition, i.e., the center portion of the cross members, is that it have the strength to withstand the impact and abrasion experienced from normal vehicle operation, and secondly, that it provide enhanced traction, e.g. for reducing tire slippage on ice and snow laden roadways.

The second major composition of the tire chain is the side portions of the cross members that provide the connection between the center portion and the side members, and further including the side members and the connectors that fixedly connect the side members to the cross members and which releasably connect the side member ends for mounting and de-mounting the tire chain to a tire.

The criteria for this second major composition is again that it contain the necessary strength to withstand the stresses involved in securing the center tread portions of the cross members of the tire chains to the tires. Such stresses result from the hammering of the tread portion against the road surface which act in a variety of force vectors to twist and pull the chain free of the tire. A second criteria is that the composition accommodate the spacing provided, e.g., between the side wall of the tire and the vehicle structure and components of the vehicle. This spacing can be as small as about 8 millimeters and any thickness of the second composition that projects from the side wall more than about 8 millimeters may be unacceptable for use on certain ones of the mentioned vehicles having minimal clearance at the inner side walls of the vehicle tires.

In a preferred embodiment, the type of tire chain that is adapted to provide the low interference fit is a cable type tire chain such as described in U.S. Pat. No. 5,236,025. Such chains consist of side members and cross members. The cross members are provided with at least one and preferably two sets of overwrapping spring segments that facilitate the gripping action of the tire to the road surface. The cross members extend across the tread of the tire in circumferentially spaced relation and the opposing ends are connected by connectors to side members (also cable type), which encircle the side wall of the tire at each side of the tire.

To mount the tire chain to the tire, the side members are split apart at strategic positions and connectors releasably connect the split apart ends. Thus, the chain, with the connectors disconnected, can be laid out on the ground and slid into position at the inner side of the tire. The outer side member has a middle split with connectors and the ends of the middle split can be moved to the outer side, front and back, and then connected at the outer side of the tire. The portion of the tire engaging the ground is located in the spacing between cross members. The chain is thereby laid out under the tire and extended to the front and rear of the tire. The chain length at the front and rear of the tire can then be wrapped onto the tire and the inner side member ends and then the outer side member ends connected together. Mounting is completed by drawing the chain to the outer side to tighten the inner side member against the inner wall of the tire and an elastic tightener is applied to the outer side member to maintain tightness. Alternatively, and as will be more fully described, the outer side member is designed to be tightened against the side wall and avoid the need for a separate tightener.

Whereas the described arrangement is not new, the problem is that there are multiple connectors that reside at the inner side wall of the tire. The cable and spring segments themselves provide a thickness of about 9 millimeters and the typical connector connecting the cross member to the side member (as well as the connection of the side member ends) is at least that much and greater. With the reduced clearance, it is desired to reduce the thickness of any part of the tire chain that resides along the sidewall, e.g. to 8 millimeters or less, but without sacrificing the integrity of the chain.

A series of design developments cooperatively provide the ability to produce a preferred embodiment of a low-cost tire chain that satisfies the low clearance requirements and retains or improves strength/wear resistance. The thickness of the cable and spring segments that extend in part radially along the inner wall of the tire is first resolved. Whereas the spring segments do not contribute to the strength (they provide improved gripping) and whereas the gripping is not required at the side walls, the spring segments are removed from the cross members at the side wall areas and bushings are crimped onto the cable at the juncture where the side walls merge with the lateral portion of the tire tread to prevent migration of the spring segments from the tread area of the tire onto the inner side wall. Thus, the portion of the cross members that extend axially down along the tire's side wall is the cable thickness only which provides the same strength but is about 3.2 millimeters in thickness.

The next area of concern is the connection of the cross member cable to the side member cable which is not wrapped and which is conventionally about 3.2 millimeters thick. A connector assembled onto the end of a cable will presumably increase the thickness at the connection by more than double. The present invention uniquely provides for this connection using radius bands. A sheet or plate of metal, e.g. 1.6 ml thick, is configured to have adjacent over and under bands of metal. The cable of both end and side members is threaded through the bands which are then crimped onto the cable, forcing the cable into a slight wave configuration. The overall width generated by the connector as crimped onto the cables is about 5 millimeters.

The releasable male and female connectors for releasably connecting the opposing side member ends each have radius bands that are also crimped onto the respective cable ends. One of the connectors is provided with a key slot and the other a mated button that fits the key slot. As connected, they, too, provide a total thickness when connected that is less than or about 5 millimeters.

The invention will be more fully understood and appreciated upon reference to the following detailed description and accompanying drawings. Whereas a preferred embodiment is disclosed above, there are numerous additional embodiments and variations thereto that are encompassed by this invention. Certain of the variations and additional embodiments will be illustrated and discussed in the following detailed description.

DESCRIPTION OF THE DRAWINGS

FIGS. 2 and 2A are full and partial (enlarged) plan views of the tire chain of FIG. 1 but laid flat as when prior to fitting the chain to a tire;

FIGS. 3 and 3A are views of two connector types used for connecting the cross members to a side member such as shown in FIG. 1;

FIGS. 4, 4A and 4B illustrate a connector for connecting cross members to a side member and for releasably connecting opposed side member ends as shown also in FIG. 1;

FIG. 5 is a plan view of a releasable connector for connecting opposed ends of an outer side member, also shown in FIGS. 2 and 2A;

FIG. 6 is a section view as taken on view line 6—6 of FIG. 5; and

FIGS. 7–22 are additional embodiments and variations of the invention.

DESCRIPTION OF THE PREFERRED EMBODIMENT

Figure 1:
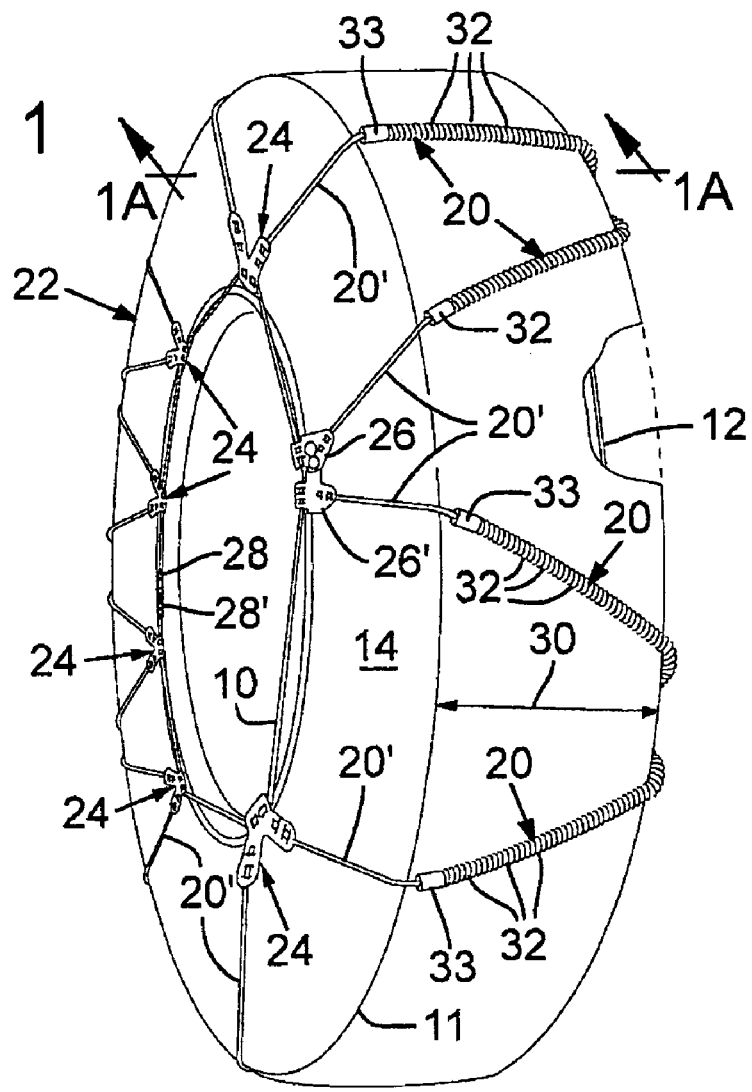
FIG. 1 is a schematic pictorial representation of a tire and a tire chain of the present invention mounted to the tire.
Figure 1A:
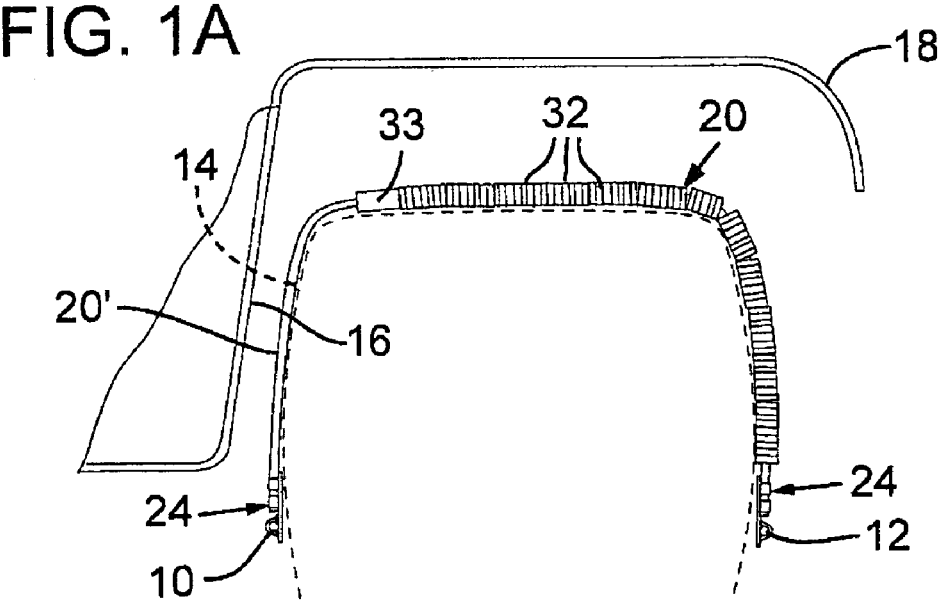
FIG. 1A is a section view as taken on view lines 1A—1A of FIG. 1 but further including a portion of the vehicle structure illustrating a restricted spacing for the tire chain.

Reference is made to FIGS. 1, 1A, 2 and 2A which illustrate a preferred embodiment of a tire chain of the present invention, mounted on a tire 22 as shown in FIGS. 1 and 1A, and in laid out in plan view as shown in FIGS. 2 and 2A, i.e., prior to assembly onto the tire as in FIGS. 1 and 1A. The tire chain of this preferred embodiment includes an inner side member 10, an outer side member 12 and cross members 20. As shown in FIGS. 1 and 1A, the inner side member 10 is fitted to the side wall 14 of the tire 22 as located at the inside of a wheel well defined by fender 18. The side wall 14 is closely adjacent to a non-rotating portion schematically represented at reference 16 as an inner wall of the fender but the reader will appreciate this minimal clearance will more likely be determined by a portion of a brake, suspension and other vehicle components or structures.

An object of the invention is to maintain the safety and durability desired of a conventional tire chain but also enabling the tire chain components to fit the restricted space between the vehicle component 16 and the tire side wall 14 as shown in FIG. 1A. The primary components of the tire chain are the inner and outer side members 10 and 12 and the cross members 20 that extend between the cross members. As particularly illustrated in FIGS. 2 and 2A (but see also FIG. 1), the cross members 20 are connected to the side members 10 and 12 by connectors 24. Additionally, in order to assemble and disassemble the tire chain to the tire, releasable connectors are provided both for the inner side members 10 (connector components 26, 26') and for the outer side members (connector components 28, 28').

Briefly, when assembling the tire chain on a tire, connectors 28, 28' intermediate the end connectors 28, 28', as viewed in FIG. 2A, are disconnected to allow the tire chain to be laid on the roadway at the inner side of the tire and then the center connectors are brought around the front and back side of the portion of the tire engaging the ground. The two connectors 26, 26' at the inner side of the tire are first pulled up to circumscribe the inner wall 14 of the tire to meet at or near the top side of the tire where connectors 26 and 26' are connected. See FIG. 1. The outer connectors 28 and 28' (opposing connectors 26, 26') are then similarly brought up at the front and rear of the tire to circumscribe the outer side wall of the tire and they are connected. The intermediate connectors 28, 28' (shown connected in FIG. 2A) are then connected. A tensioning cord is typically applied to take up any remaining slack. However, applicant proposes a newly developed concept whereby the outer side member is configured to replace the tensioning cord and is disclosed separately herein in a later section. The tensioning cord is not illustrated.

With reference to FIGS. 1 and 1A, it will be noted that the primary areas of concern is that portion of the tire chain that rotates with the tire and directly adjacent the non-rotating vehicle structure 16. The chain components particularly affected by this limited spacing are: a) the portion of the cross members 20., i.e., 20', that extend from the tread portion 30 of the tire along the side wall; the inner side member 10; the connectors 24 connecting the cross member portion 20' to the inner side member; and the releasable connector components 26, 26'.

It is desirable that these components fit closely against the tire side wall 14 and not project laterally from the side wall so as to engage the non-rotating portion 16. It is also desirable that the strength of these components not be compromised. For the example herein discussed, it is considered desirable to maintain the lateral dimension of the affected components as projected from the side 14 of the tire to no more than about 6 millimeters.

Reference is first made to the cross members 20 as shown in FIGS. 1, 1A and 2A. Cross member 20 is typically comprised of a cable core 20' with spring segments 32 surrounding the core. The spring segments 32 provide enhanced gripping on a roadway covered with snow or ice. The springs add dimension to the cable core but without adding strength. As the side wall is not involved in the traction, the springs are superfluous to the cross member 20' but undesirably, in the present context, adds circumferential dimension. Accordingly, the springs 32 are removed from cable portion 20' at the inner side of the tire and a bushing 33 is affixed to the cable 20' at about the juncture 11 of the side wall 14 and tread 30 of the tire (see FIG. 2A) to prevent migration of the spring segments 32 from their position on the tread and onto the side wall 14. This reduces the width or lateral dimension of the cross member 20 at the side wall to the thickness of the cable 20' only, e.g., 3.2 millimeters.

Reference is now made to FIGS. 2A, 3 and 3A which illustrate alternate types of connectors for securing the cable portions 20' of the cross member 20 to the side member 10 which is also a cable only, e.g., having 3.2 mil thickness.

The connectors 24, 24' of FIGS. 3, 3A are of formed metal sheet of about 1.6 mil thickness. As illustrated the connector 24, 24' include a base portion 34, 34' and diverging fingers 36. The base portion 34, 34' clamps onto the side member 10 (see FIG. 2A) whereas the fingers 36 clamp onto the core portion 20' of the cross members 20. The metal of the connectors 24, 24' is formed into bowed "radius bands" 38, 38' that alternate between under and over bands. It will be appreciated that each connector portion includes 3 to 5 radius bands and are indicated by reference number 38 or 38'. Whereas FIGS. 3 and 3A do not show the cable core 20' clamped to the connector by the radius bands, such is shown for the connector of FIGS. 5 and 6 which are referred to here only to provide an understanding of the manner of securement of the radius bands 38 to the cable core/side member 10. As shown in FIGS. 5 and 6, the side member 12 (same as cable core 20') is threaded over and under at least 3 of the bands, and then the bands are pressed or crimped together to lock the cable core to the connector. (The outer most band may remain uncrimped to avoid what otherwise could be a tight outer edge of the metal of the connector digging into the cable core.) In the process, as noted in FIG. 6, the cross member 12 is compressed into a wave form that accomplishes secure gripping as well as reducing the thickness of the combination of cable core and connection. Whereas the radius fingers are both above and below the cable core, the combined thickness is but the thickness of the cable core and a single thickness of the sheet metal, e.g., 3.2 mil. plus 1.6 mil, or about 5 millimeters. thickness. Again, this arrangement of connection as shown in FIGS. 5 and 6 apply to all of the connectors where is provided by radius bands.

Referring to FIGS. 1, 2, 2A and 3, it will be noted that the fingers 36 of connectors 24 are angled to accommodate the angled direction of the cables as they cross from one side member to the other. Such angling of the fingers is beneficial as the cable is less likely to become aligned with and seat into a tread groove with consequential wearing problems.

Reference is now made to the releasable connectors 26, 26' and 28, 28' as shown in FIGS. 4, 5 and 6. Like connectors 24 of FIGS. 1, 2, 2A and 3, the releasable connector 26, 26' of FIG. 4 are connected to the cable cores 20' by the crimping of radius bands 38. As explained, the side member 10 is the same as cable core 20' and similarly are crimped onto the connectors 26, 26' using radius bands 38. Connectors 28, 28' of FIGS. 5 and 6 are connected to side member 12 also using radius bands 38 for convenience of manufacturing rather than for space consideration. However, it will be understood that two sides of the tire chain could be similarly structured to provide reversibility of the tire chain and/or to accommodate a tight spacing at the outer side of the wheel well.

In both the structures of connectors 26, 26' and 28, 28', the one part of the connector portion (26' and 28') is provided with female key slots 40 and the opposite portion (26 and 28) is provided with male flat-headed button connectors 42. As can be particularly seen in FIG. 6, the connectors 26, 26' and 28, 28' provide no greater thickness than the thickness of the cable and radius bands.

As will be apparent, there is no sacrifice in the strength of the tire chain while reducing the lateral projection of the tire chain to a minimum as desirable for avoiding interference. The radius bands are proven to provide the secure attachment required and the metal connectors produce the necessary strength. The maximum lateral projections from the tire wall is the singular width of the sheet metal plus the thickness of the cable core.

A further improvement is to the manner of connecting the button connectors illustrated in FIGS. 4A and 4B. The button and key slot are so arranged relative to the bumps provided by the bowing of the radius bands 38 whereby connection/disconnection requires angular positioning as seen in FIG. 4A. Following seating of the button 42 in the slot as seen in FIG. 4A, the components can be oriented to an aligned position as shown in FIG. 4B. Disconnection requires similar angular orientation of the components 26, 26'. Such inhibits the likelihood of accidental disconnection.

Whereas the alternative embodiment of FIG. 3A has not been explained in detail, it will be appreciated that the opened radius bands 38' allow for easier connection to the side member 10, i.e., the side member does not have to be extended through the connector base 34'. The opened bands allow the cable portion/side member to be inserted under the open bands and the bands 38' closed or crimped onto the side member.

Numerous other modifications will become apparent to those skilled in the art and the invention is intended to encompass all such variations as may be determined by the broad interpretation of the elements of the claims appended hereto. For illustration purposes, examples of such other embodiments are illustrated and briefly described hereafter.

Figure 7:
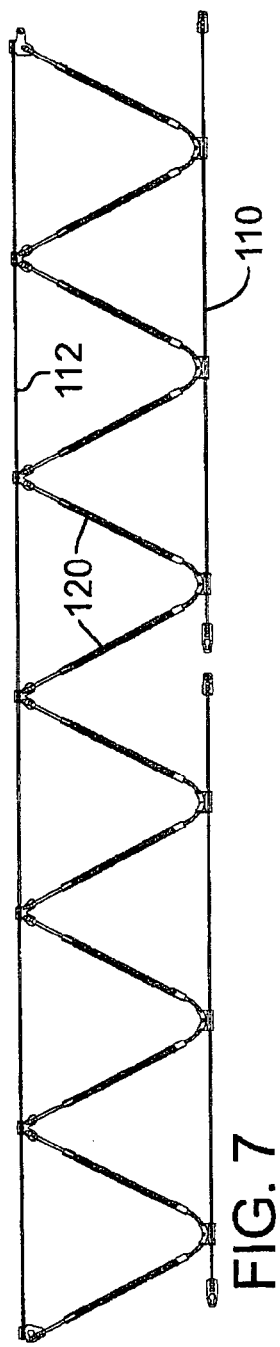
Figure 7A:
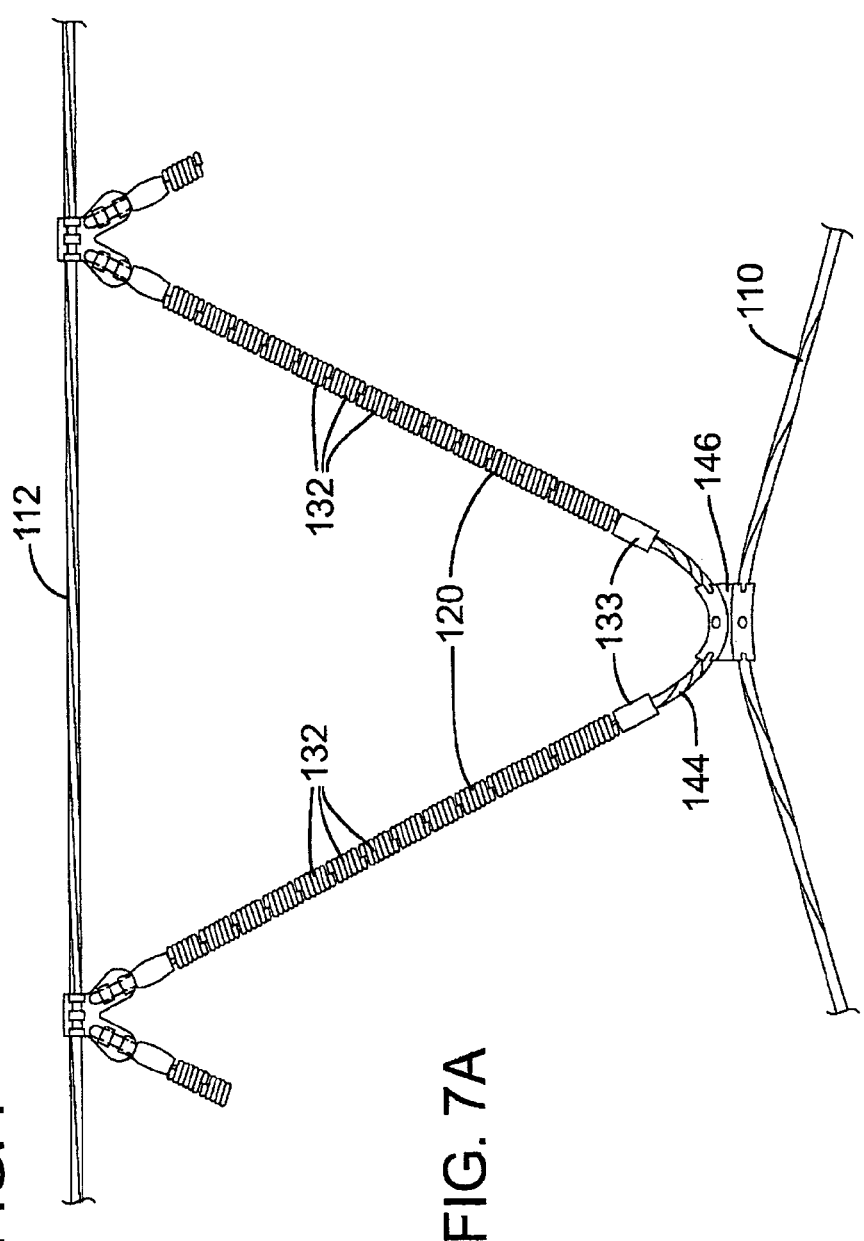

FIGS. 7 and 7A disclose a further embodiment of the invention. Cross member 120 is doubled in length and folded to provide a loop portion 144 at the inner side of the tire. A modified connector 146 is folded over and crimped onto loop portion 144 and inner side member 110. Bushings 133, as in the embodiment of FIGS. 1 and 2, prevent migration of the spring segments 132 onto the loop portion 144, i.e., that portion of the cross members that fit against the side wall of a tire.

Figure 8:
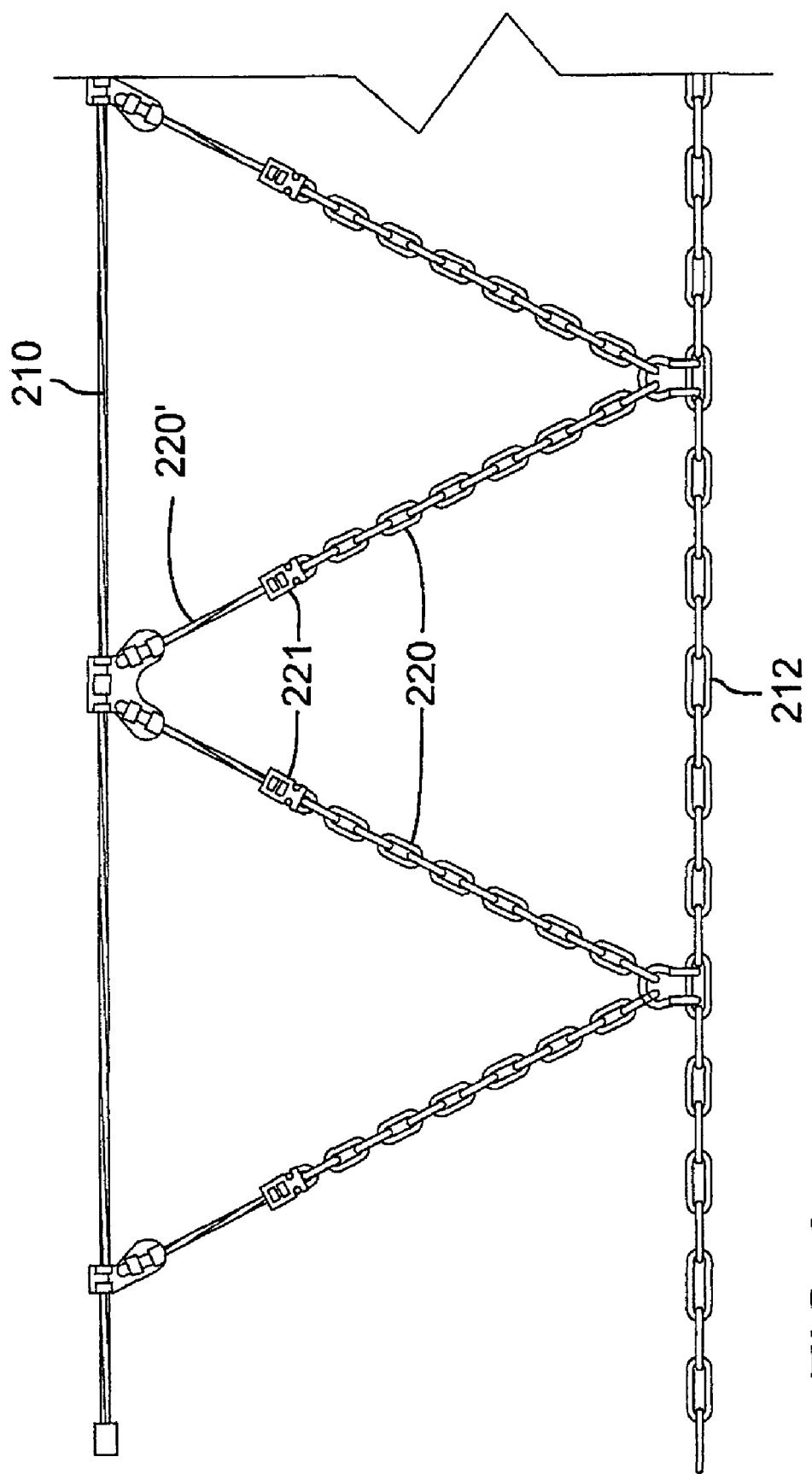
Figure 9:
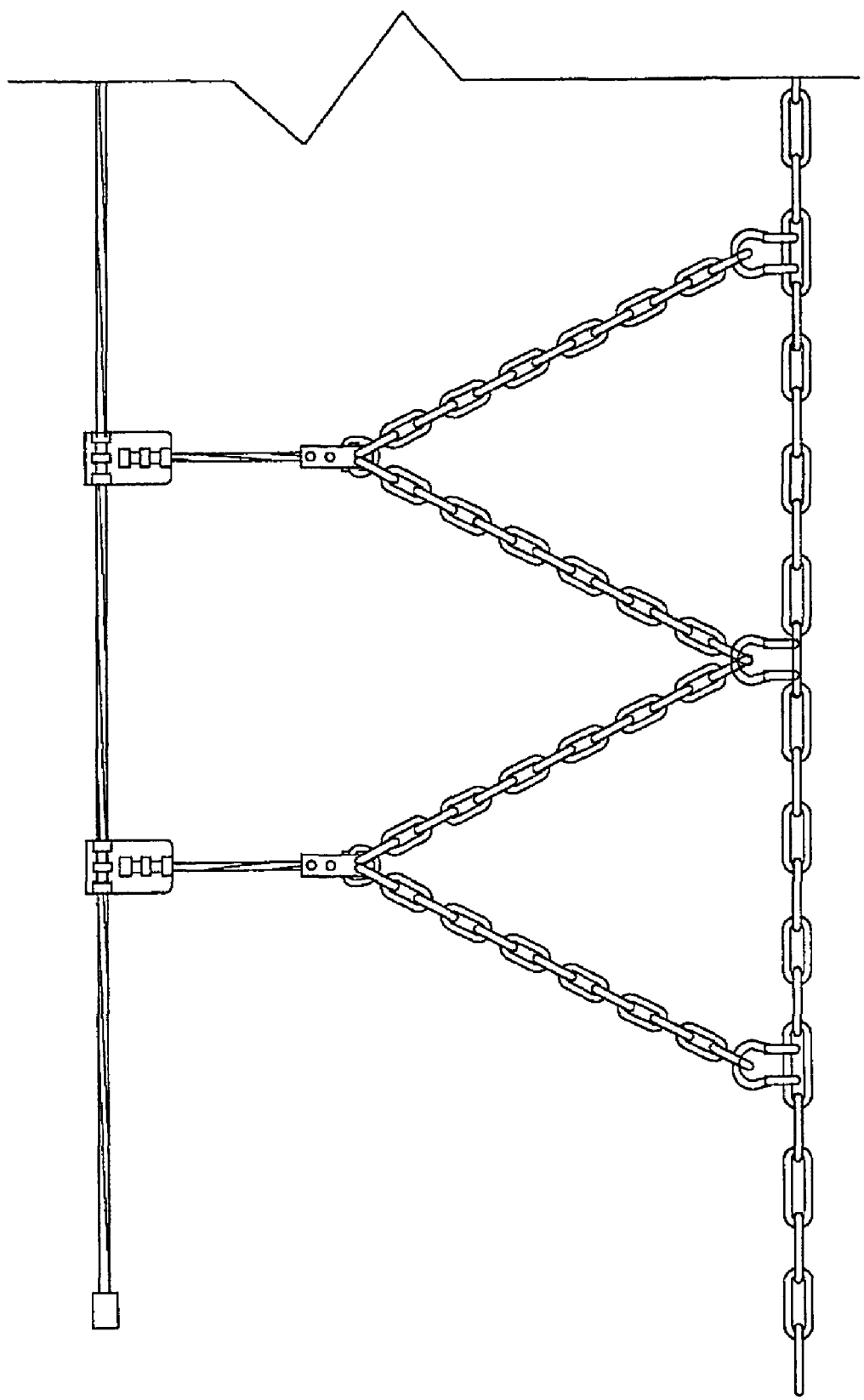
Figure 10:
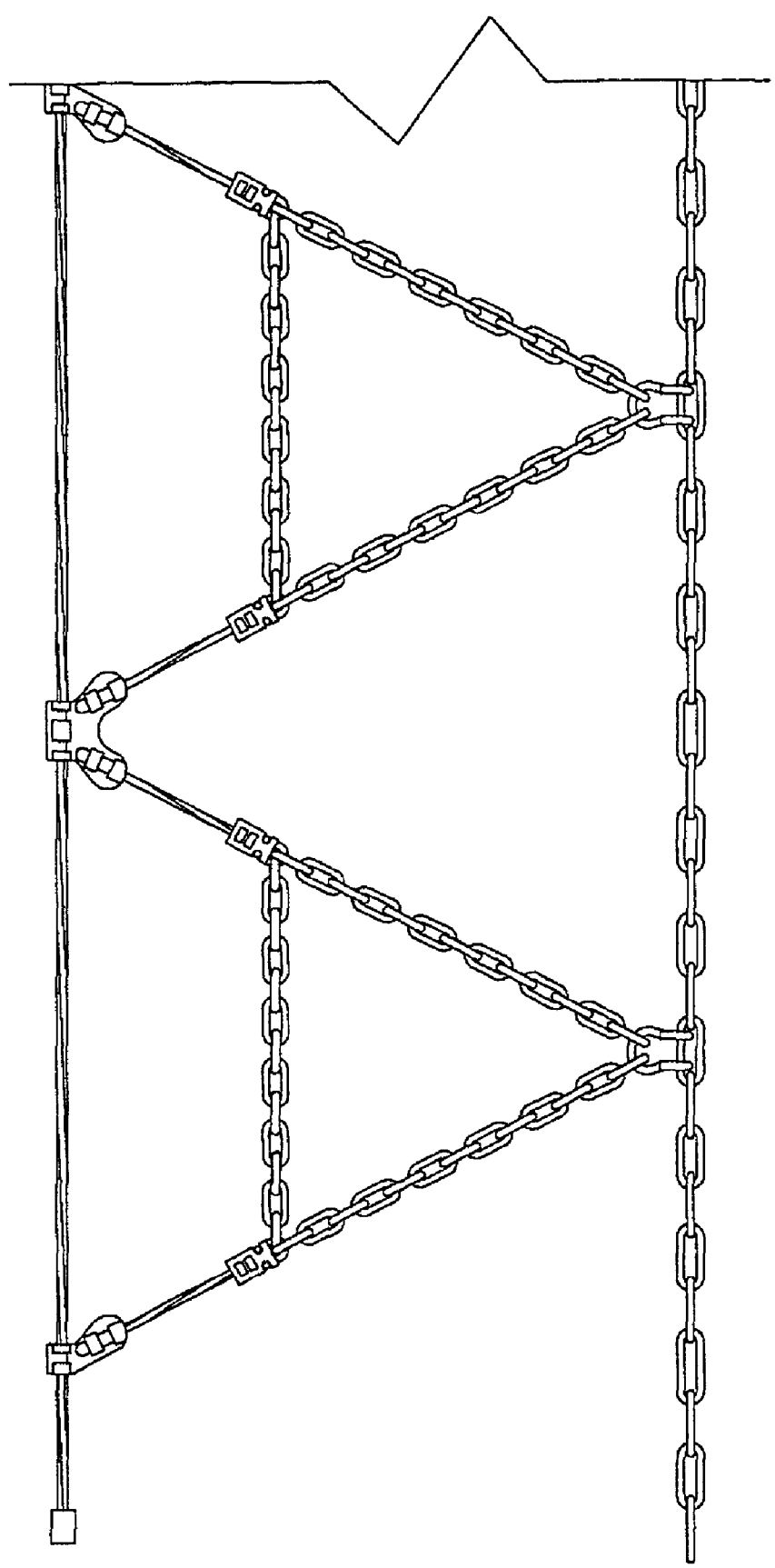
Figure 11:
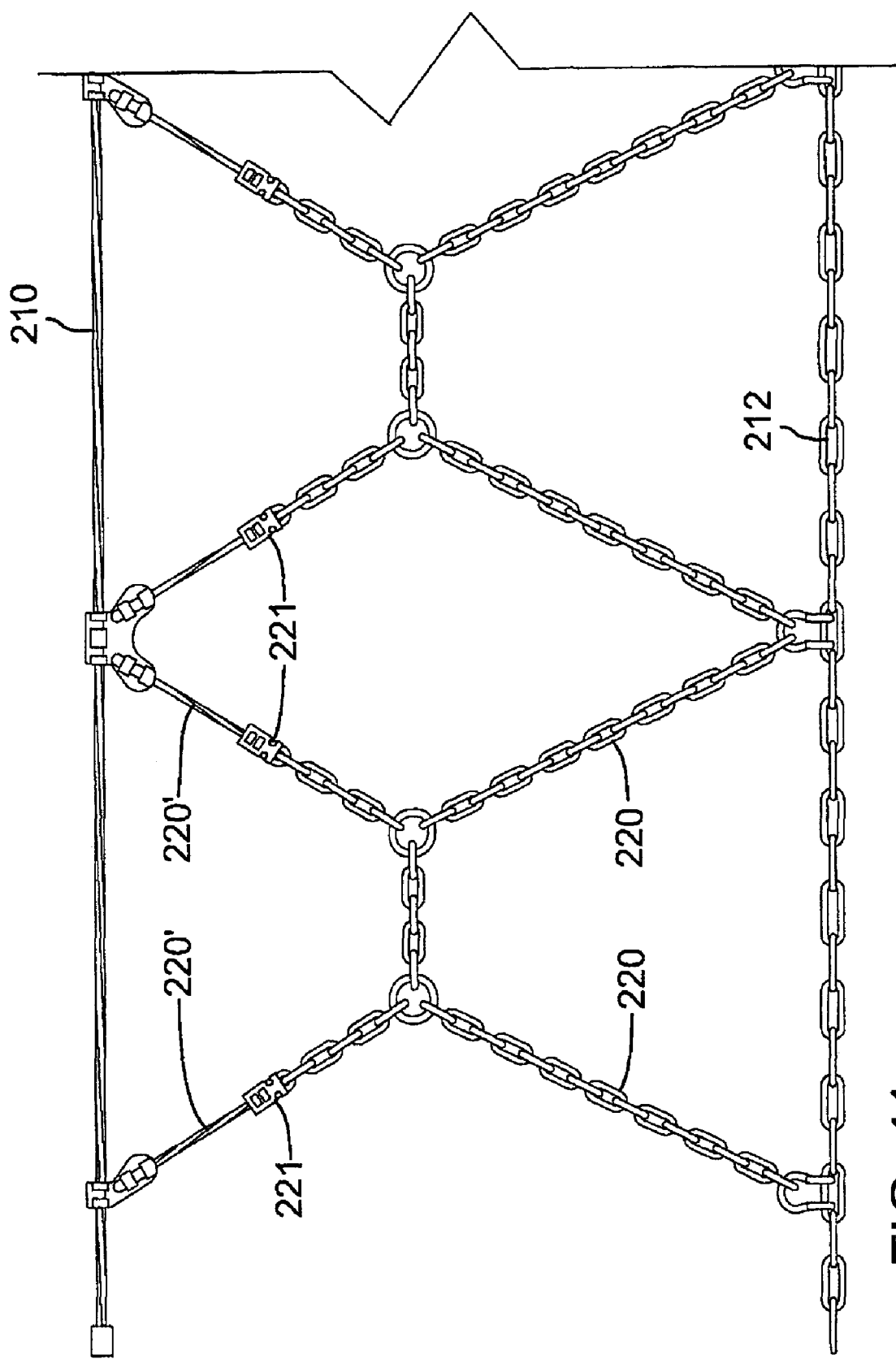
Figure 12:
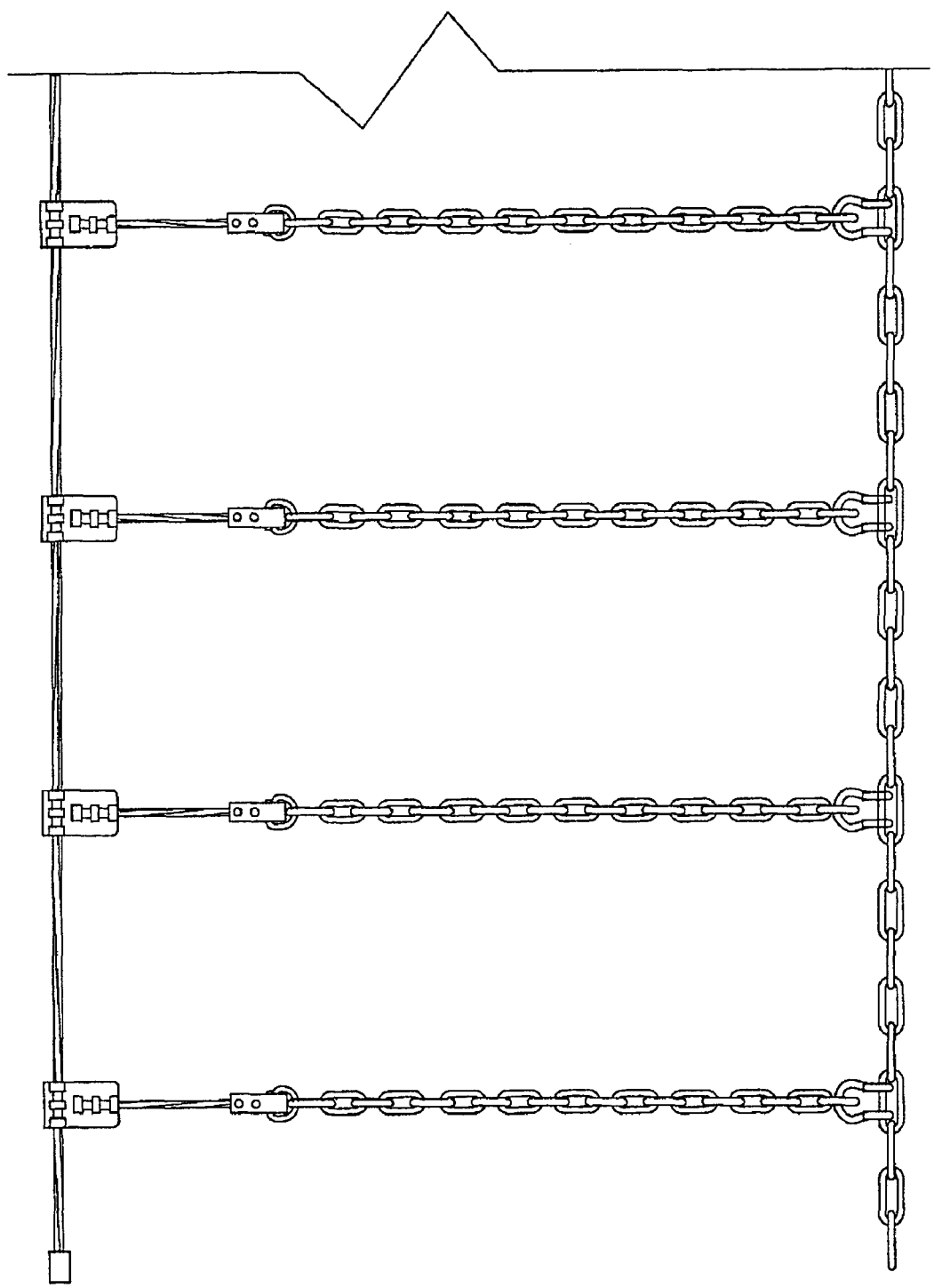

FIG. 8 is a further embodiment and particularly emphasizes the differing objectives of the two functional compositions. The outer side member 212 (where thickness is not as likely a problem) is comprised of chain lengths as is the major portion of the cross members 220. That segment of the cross member 220', intended to extend down the side wall at the inner side of the tire, is provided with the smaller dimensioned cable which is connected to the chain links via connectors 221 (the connectors utilizing the radius band type of connection as previously described). As in the embodiment of FIGS. 1 and 2, the inner side member 210 is cable also as disclosed for the embodiment of FIGS. 1 and 2.

FIGS. 9, 10, 11 and 12 are all variations of the FIG. 8 embodiment, i.e., combining cable and chain links as the cross members, with chain applied where gripping is desired, i.e., extended across a tire tread, cable applied where the smaller dimension is desired, e.g., at the inner side wall. Further, the outer side member is chain and the inner side member is cable.

Figure 13:
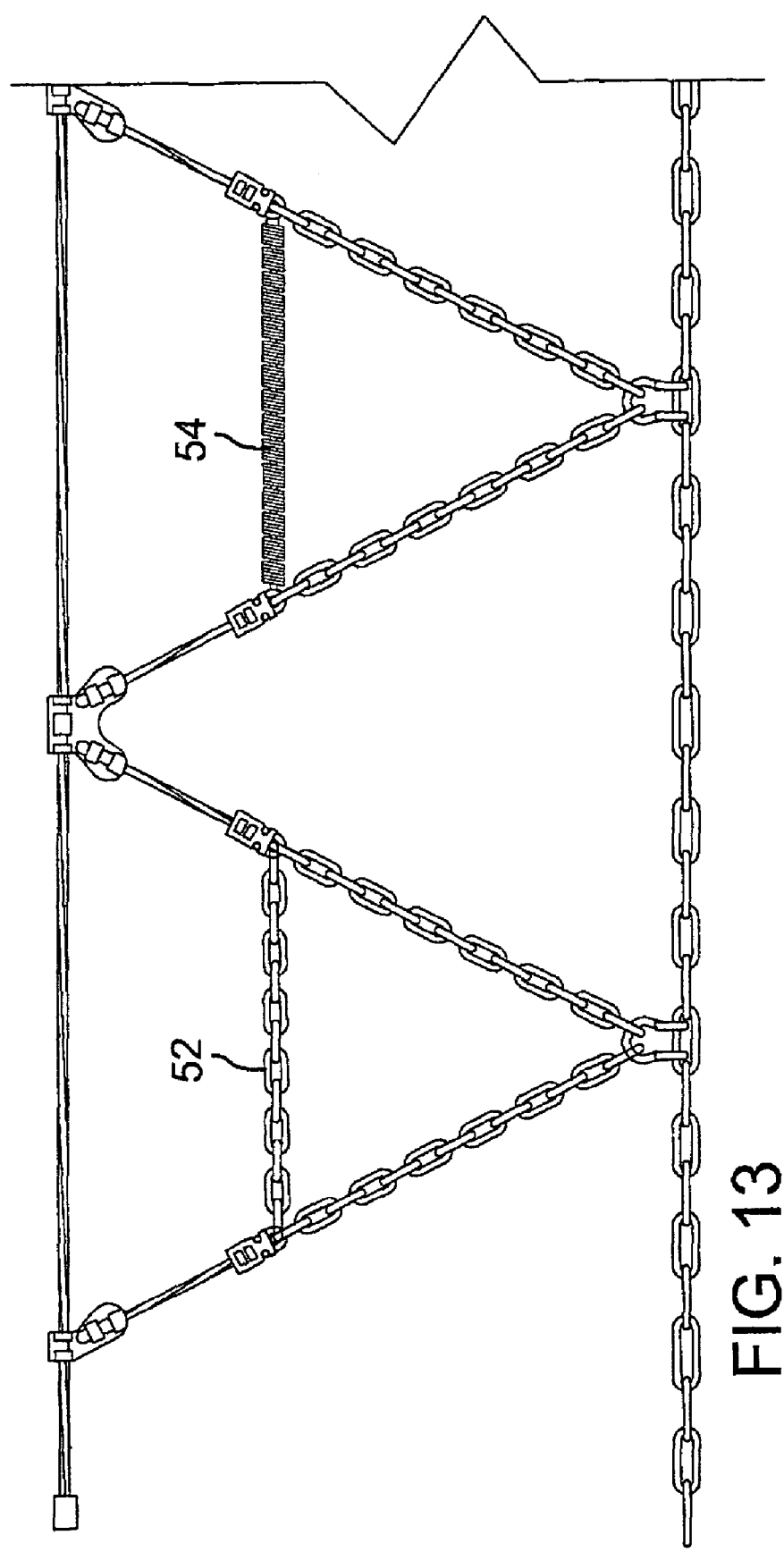
Figure 14:
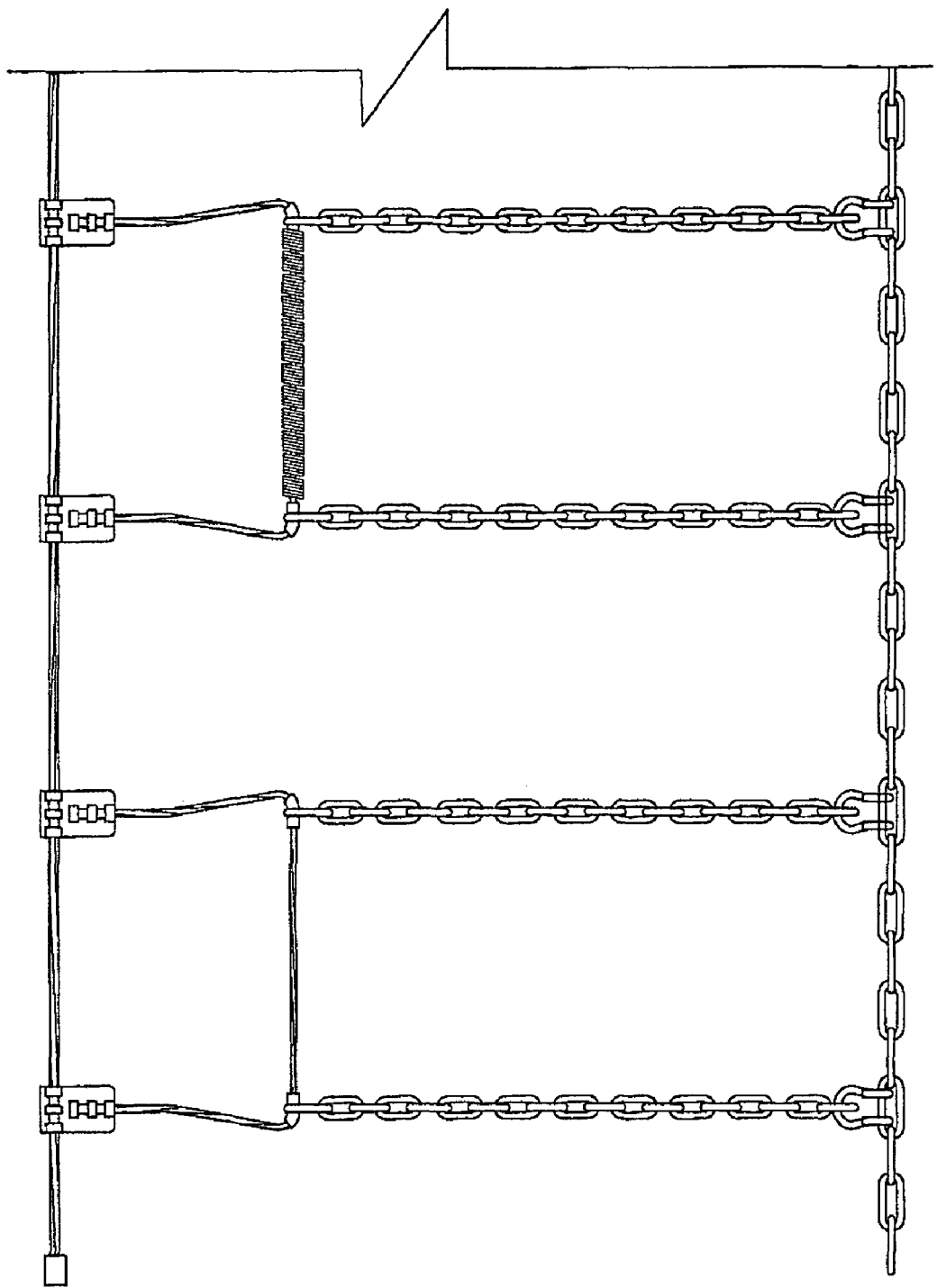
Figure 15:
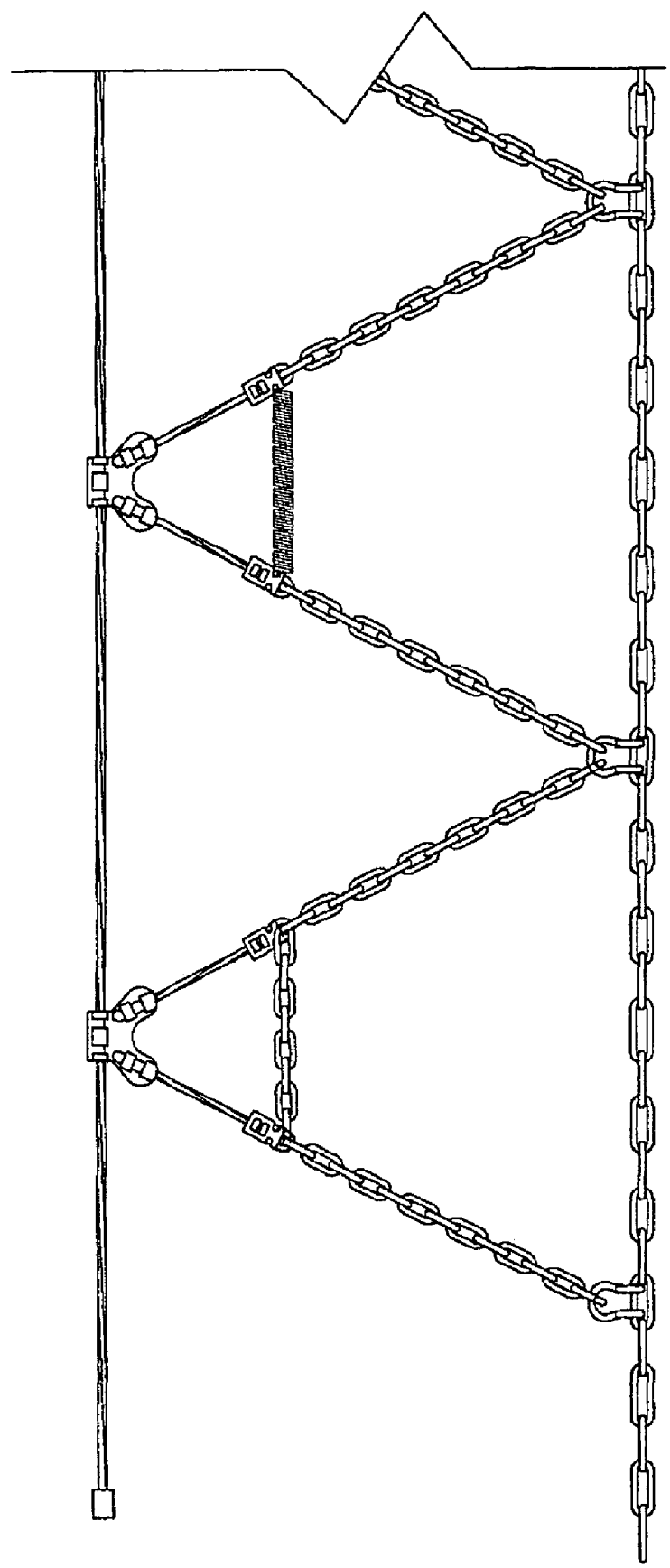

FIGS. 13 and 14 are directed to further variations. The V-shaped cross members of FIG. 13 are the described chain and cable combination as previously illustrated and described, but including connecting segments 52, 54 substantially at the juncture 11 of the tire and where the chain and cable intercept. As illustrated, segment 52 is chain links, and 54 is cable having spring segments as described for the cross members of FIG. 1, etc. FIGS. 14 and 15 can be considered an H-shape with an extended length of cable connected at both ends to the inner cable side member via radius band connections, the intermediate cable being looped through a pair of cross member chain lengths as shown. The cable length extended between the chain links may be only cable or fitted with spring segments as also illustrated.

FIG. 15 is similar to FIG. 14 but with the cross members forming A-shapes and the connection between the cross members, in one case, provided by a further chain length.

FIG. 16 illustrates a still further variation where pairs of cross members are centrally connected, i.e., mid way of the tread width, by short chain lengths 54, or short spring segments/cable lengths 56. The inner side member is cable and the cross members, as extended from the inner side member, is the described cable core, bushing and spring segments/cable core as described for the embodiment of FIGS. 1 and 2.

FIG. 17 is a variation of the embodiment of FIGS. 2 and 2A with alternating spring segments 32 and composite members 50.

Figure 17A:
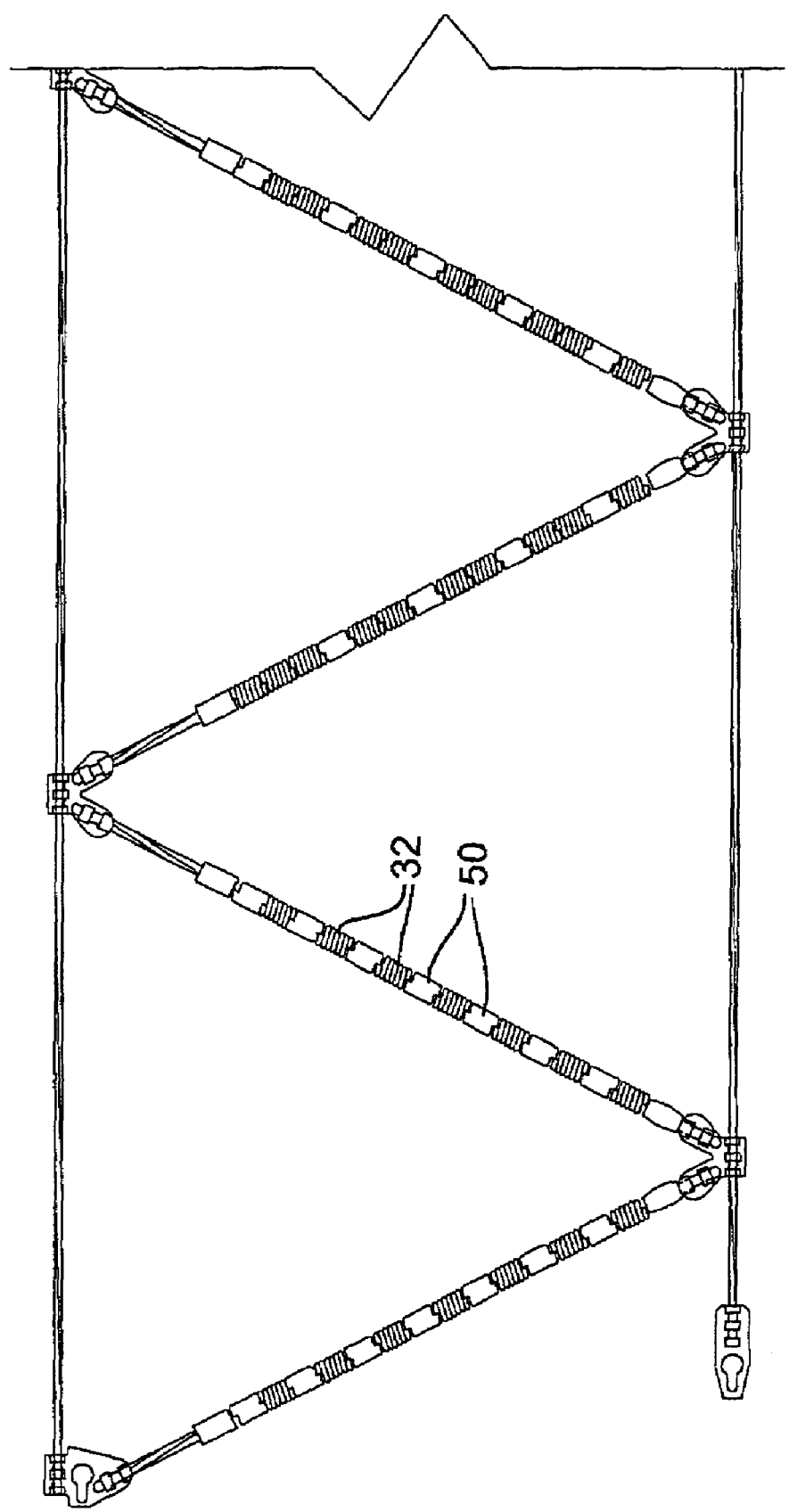

FIG. 17A is a second variation of the embodiment of FIGS. 2 and 2A with alternating spring segments 32 and composite members 50.

FIG. 18 illustrates a further embodiment of the invention. FIG. 19 is a side view of a portion as indicated. This embodiment utilizes a strap type configuration, e.g., of fabric reinforced rubber, to produce the cross members. The inner and outer side members are both cable as, e.g., described in FIG. 2. The center portion 44 that spans the tread is ribbed as illustrated in FIG. 19. That portion that extends down the inner side wall of the tire may be a thinner section 46 as permitted by the strap's width, i.e., to provide the desired strength and again as illustrated in FIG. 19, or it may again be a cable length 46 secured to the strap 44 by an embedded cable loop 60 as illustrated in the cut-away portion at the far left strap of FIG. 18.

As well known and as previously indicated, once the tire chain was mounted on the tire, typically an elastomeric tensioner was applied to the outer side member. Such tensioner is considered necessary for tightening the tire chain but generates an additional part and further often extends across a hub portion of the tire and can mark the hub, which hubs are often considered an attractive feature of a vehicle, and such marking is undesired.

To avoid such interference with the hub and to eliminate the extra part, a variation to the outer side member can be provided with tensioning mechanism to enable the side member to also produce the tightening or tensioning function.

Figure 20:
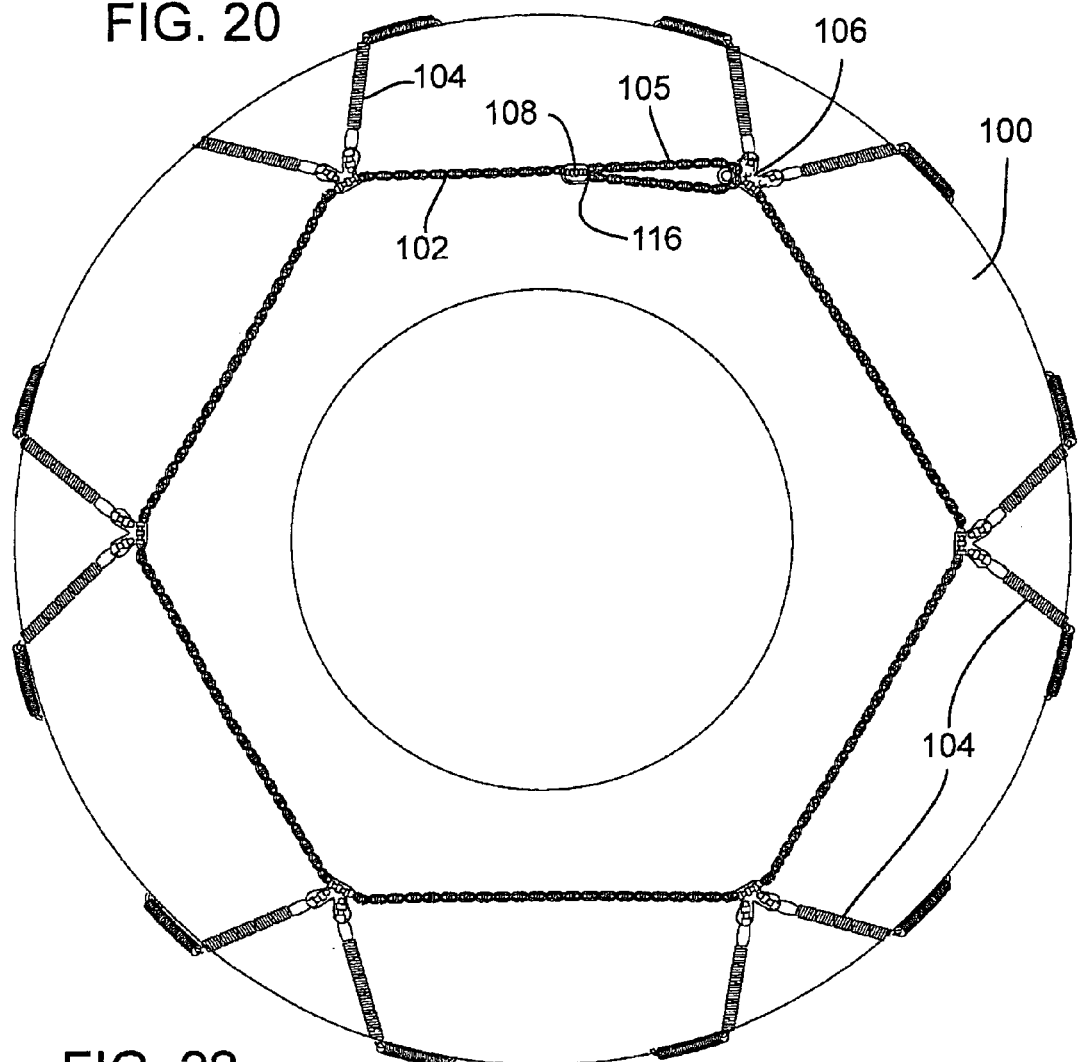
Figure 22:
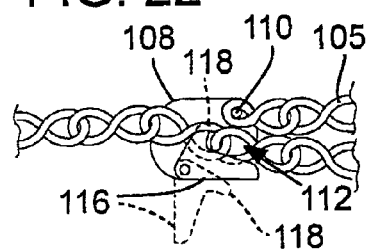
Figure 21:
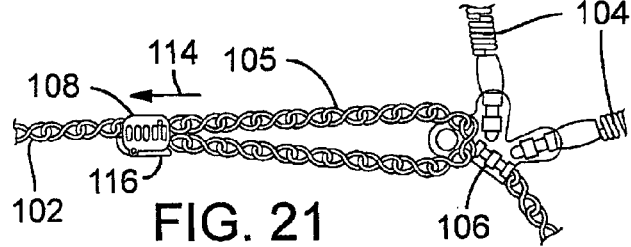

Referring to FIGS. 20–22, a tire 100 is shown having a tire chain mounted thereto. What is shown of the tire chain is an outer side member 102 and cross members 104 extended from the outer side members outwardly to the tread of the tire. The outer side member is preferably interconnected chain links as illustrated, e.g., in FIGS. 9–12. With further reference to FIGS. 20–22, the side member 102 can be shortened by providing an end of the side member with a slide ring 106 which is of sufficient size to allow an opposing end of the side member to be threaded through the ring and cinched back over the ring as illustrated in FIG. 21. The extreme end of the opposing end of the side member is secured to a lock member 108, e.g., by a rivet 110.

As noted from FIG. 22, the lock member has a through passage 112 and the side member chain is extended through the through passage 112 as illustrated. By simply pulling manually on the lock member 108 in the direction of arrow 114, the side member 102 is shortened and the entire tire chain is pulled inwardly toward the center of the tire.

When sufficiently tightened, a lock bar 116 of the lock member 108 is pivoted down onto the chain within the lock member and the hook portion 118 of the lock bar 116 hooks into a chain link preventing movement opposite to arrow 114. The side member is thereby locked at the reduced length to retain the side member in the shortened/tensioned condition. It will be appreciated that one or more tensioning mechanisms as described above may be used.

Persons skilled in the art will conceive of numerous further embodiments and variations thereto. Accordingly, the invention is not limited to the specific embodiments and variations herein, but is intended to encompass all such tire chains as may be considered to encompass the definition of the claims appended hereto.

What is claimed is:

1. A low interference tire chain adapted to fit a vehicle tire comprising:

paired inner and outer side members and cross members, said cross members being adapted to extend from one side member to the other side member, and including inner and outer cross member portions extended along inner and outer side walls of the tire and an intermediate center portion being extended across a tread portion of the tire;

said inner cross member portions and said inner side member being composed at least in part of a high strength cable, and connectors connecting said inner cross member portions to said inner side member, said combination of inner side member, inner cross member portions and said connectors having a maximum projection from the side wall of the tire of less than or equal to about 8 millimeters; and wherein the inner cross member portion is adapted to be in contact with at least a portion of the inner side wall of the tire to create a low interference assembly.

2. A low interference tire chain as defined in claim 1 wherein the center portion is high strength cable wrapped with spring segments for enhanced gripping to a road surface, and a retention bushing fitted to the cross member to prevent the springs from migrating onto the inner cross member portions.

3. A low interference tire chain as defined in claim 1 wherein the inner side member is high strength cable having opposed ends and a releasable connector connecting the ends to provide an endless side member that encircles the inner side wall of the tire, the releasable connector having male and female matable components, said components secured to the respective cable ends by radius bands.

4. A low interference chain as defined in claim 3 wherein the connection and disconnection of the male and female matable components requires the components to be misaligned whereby the cable ends are angularly disposed one to the other to thereby inhibit accidental disconnection with the tire chain assembled to the tire.

5. A low interference traction device adapted to fit a vehicle tire comprising:
inner and outer side members and one or more cross members, the one or mare cross members being adapted to extend from en inner side member to an outer side member, and including inner and outer cross member portions extended along inner and outer side walls of the tire respectively and an intermediate center portion being extended across a tread portion of the tire, and wherein the intermediate center portion includes traction components coupled there to;
an inner transition area defined by the intersection of the inner side wall and the tread portion of the tire; and
a retention device fixedly secured to the one or more cross members near the transition area to prevent migration of the traction components past the transition area onto the inner cross member portion and further adapted to not cause the inner cross member portions to stand off the entire inner side wall of the tire.

6. A low interference tire chain comprising:
a first assembly of components adapted to enhance gripping of a road engaging tread of a tire to the road, the first assembly of components including lateral cross members adapted to carry mad engaging members;
a second assembly of components adapted to secure the first assembly of components to the tire, the second assembly including inner and outer radial cross members, inner and outer side members and inner and outer side connectors;
wherein the inner side members, the inner radial cross members, and the inner side connectors, as assembled, define a maximum projection from an inner side wall of the tire that is less than the dimensional projection of the first assembly of components from the road engaging tread.

7. A low interference tire chain as defined in claim 6 wherein the maximum projection of the second assembly of components from the inner side wall of the tire is no greater than about 8 millimeters.

8. A low interference tire chain as defined in claim 6 wherein the inner radial cross members, side members and lateral cross members are cable lengths, the cable length of each inner radial cross member is a continuum of a cable length of a corresponding lateral cross member, and further including a retaining device fixedly mounted on the cable at a juncture between the lateral and radial cross members to prevent migration of the road engaging members onto the radial cross members.

9. A low interference tire chain as defined in claim 8 wherein the road engaging members are spring segments mounted on the cable lengths of the lateral cross members for enhanced road surface gripping.

10. A low interference tire chain as defined in claim 8 wherein the radial cross members are connected to the cable side members by connectors that are sheet metal plates having two or more formed radius bands that are crimped onto ends of the cables to secure the connectors to the cables.

11. A low interference tire chain as defined in claim 6 wherein the cable side members have ends connected together by releasable connectors, said releasable connectors having a button and key slot connection requiring misalignment of the connector ends to achieve releasable connection and disconnection for inhibiting inadvertent disconnection.

12. A low interference tire chain as defined in claim 9 wherein a single length of cable extends from the outer side member to the inner side member and back to the outer side member to form a pair of cross members, an intermediate portion of the cable length forming a loop, bushings provided for each side of the loop, and the loop providing the radial cross member portions of the cross members.

13. A low interference tire chain as defined in claim 7 wherein the radial cross member portions are cable lengths and the lateral cross member portions are chain link lengths connected to the cable lengths by connectors.

14. A low interference tire chain as defined in claim 6, wherein the inner radial cross members are cable lengths and are further adapted to contact at least a portion of the inner side wall of the tire to create a low interference assembly.

15. A low interference tire chain as defined in claim 1, wherein the inner side members and the inner radial cross members are cable lengths and the maximum projection is less than or equal to one and a half times the diameter of the cable lengths of the inner radial cross members and inner side members.

* * * * *

UNITED STATES PATENT AND TRADEMARK OFFICE
CERTIFICATE OF CORRECTION

| | | |
|---|---|---|
| PATENT NO. | : 7,080,674 B2 | Page 1 of 2 |
| APPLICATION NO. | : 10/637797 | |
| DATED | : July 25, 2006 | |
| INVENTOR(S) | : Clark et al. | |

It is certified that error appears in the above-identified patent and that said Letters Patent is hereby corrected as shown below:

Fig. 18
Reference numeral 44 appears twice in the drawing. The first appearance directed to the center portion should read --45--, as shown below.

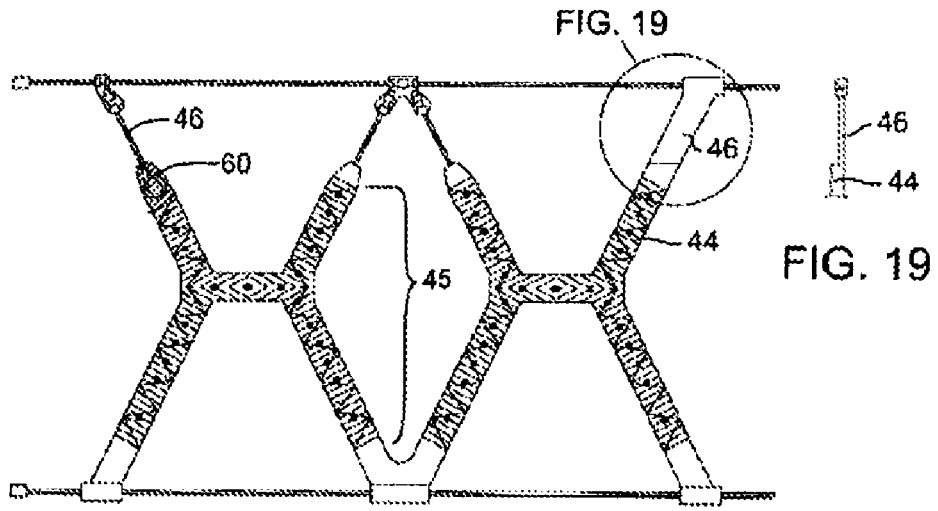

Column 7
Line 55, "...center portion 44." should read --...center portion 45...--.

Column 8
Line 18, "opposing end." should read --opposing end 105...--.

Column 9
Line 20, "...one or mare." should read --...one or more...--.
Line 21, "...en inner." should read --...an inner...--.
Line 27, "...coupled there to;" should read --...coupled thereto;--.

UNITED STATES PATENT AND TRADEMARK OFFICE
CERTIFICATE OF CORRECTION

PATENT NO. : 7,080,674 B2
APPLICATION NO. : 10/637797
DATED : July 25, 2006
INVENTOR(S) : Clark et al.

It is certified that error appears in the above-identified patent and that said Letters Patent is hereby corrected as shown below:

Column 10
Line 44, "...claim 1,..." should read --...claim 6,...--.

Signed and Sealed this

Fifteenth Day of January, 2008

JON W. DUDAS
*Director of the United States Patent and Trademark Office*